(12) United States Patent
Iwamoto et al.

(10) Patent No.: US 10,640,002 B2
(45) Date of Patent: May 5, 2020

(54) NON-CONTACT POWER TRANSMISSION SYSTEM

(71) Applicant: HONDA MOTOR CO., LTD., Minato-ku, Tokyo (JP)

(72) Inventors: Takuya Iwamoto, Wako (JP); Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/983,177

(22) Filed: May 18, 2018

(65) Prior Publication Data
US 2018/0339598 A1    Nov. 29, 2018

(30) Foreign Application Priority Data
May 24, 2017 (JP) ................. 2017-102408

(51) Int. Cl.
| | |
|---|---|
| B60L 11/18 | (2006.01) |
| H02J 50/12 | (2016.01) |
| H02J 50/90 | (2016.01) |
| H02J 7/02  | (2016.01) |
| B60L 53/12 | (2019.01) |
| B60L 53/38 | (2019.01) |

(Continued)

(52) U.S. Cl.
CPC .......... *B60L 11/1829* (2013.01); *B60L 53/12* (2019.02); *B60L 53/305* (2019.02); *B60L 53/36* (2019.02); *B60L 53/38* (2019.02); *H02J 7/025* (2013.01); *H02J 50/12* (2016.02); *H02J 50/90* (2016.02); *B60L 2240/12* (2013.01)

(58) Field of Classification Search
CPC .............................. B60L 11/1829; H02J 7/025
See application file for complete search history.

(56) References Cited

U.S. PATENT DOCUMENTS

2013/0030615 A1*   1/2013   Ichikawa ................ B60L 53/36
                                                                701/22
2015/0217648 A1    8/2015   Ichikawa et al.
(Continued)

FOREIGN PATENT DOCUMENTS

| JP | 2013-150430 | 8/2013 |
|---|---|---|
| JP | 2014-099964 | 5/2014 |

(Continued)

OTHER PUBLICATIONS

Japanese Office Action for Japanese Patent Application No. 2017-102408 dated Sep. 11, 2018.

*Primary Examiner* — Richard V Muralidar
(74) *Attorney, Agent, or Firm* — Amin, Turocy & Watson, LLP

(57) ABSTRACT

A storage device stores a voltage value-horizontal distance characteristic that represents a relation between a horizontal distance between a primary coil and a secondary coil, and a voltage value. A characteristic setting unit sets a voltage value-horizontal distance characteristic that matches a vehicle state, on the basis of a value for the vehicle state (vehicle speed v, vehicle height h, and inclination i) detected by sensors and the voltage value-horizontal distance characteristic stored in the storage device. A horizontal distance estimation unit estimates the horizontal distance on the basis of the voltage value-horizontal distance characteristic and the voltage value.

8 Claims, 6 Drawing Sheets

(51) Int. Cl.
  *B60L 53/36* (2019.01)
  *B60L 53/30* (2019.01)

(56) References Cited

U.S. PATENT DOCUMENTS

2015/0239361 A1  8/2015  Niizuma
2016/0288657 A1  10/2016  Tokura

FOREIGN PATENT DOCUMENTS

| | | |
|---|---|---|
| JP | 2015-074266 | 4/2015 |
| JP | 2015-120378 | 7/2015 |
| JP | 5937631 | 6/2016 |
| JP | 5966332 | 8/2016 |
| WO | 2011/132272 | 10/2011 |

* cited by examiner

ABSTRACT# NON-CONTACT POWER TRANSMISSION SYSTEM

CROSS-REFERENCE TO RELATED APPLICATION

This application is based upon and claims the benefit of priority from Japanese Patent Application No. 2017-102408 filed on May 24, 2017, the contents of which are incorporated herein by reference.

BACKGROUND OF THE INVENTION

Field of the Invention

The present invention relates to a non-contact (contactless) power transmission system that transmits electric power between a primary coil and a secondary coil, particularly to a non-contact power transmission system that transmits a weak power from a power transmission side to a power reception side for alignment of the primary coil and the secondary coil, and detecting a low power excitation (LPE) voltage that is generated between both ends of a resistor when the weak power is received.

Description of the Related Art

Along with development of electric vehicles such as electric automobiles and hybrid automobiles, a technique regarding non-contact charging for charging a battery of an electric vehicle without contact has been developed. For the efficient non-contact charging, accurate alignment is necessary for a primary coil provided for a charging station and a secondary coil provided for an electric vehicle.

Techniques for the alignment of the primary coil and the secondary coil are disclosed in, for example, Japanese Laid-Open Patent Publication No. 2014-099964 (paragraph [0031]) and Japanese Patent No. 5966332 (paragraph [0049]). A device according to Japanese Laid-Open Patent Publication No. 2014-099964 (paragraph [0031]) detects positions of wheels by the use of a plurality of proximity sensors provided on the ground side (on the charging station side) for the alignment of the primary coil and the secondary coil. A device according to Japanese Patent No. 5966332 (paragraph [0049]) obtains the power transmission efficiency in transmitting power from the primary coil to the secondary coil, and shows an occupant a direction where the electric vehicle should move in accordance with the power transmission efficiency.

SUMMARY OF THE INVENTION

In the technique according to Japanese Laid-Open Patent Publication No. 2014-099964 (paragraph [0031]), the proximity sensors need to be provided on the charging station side; therefore, the costs of installing the charging station increase. On the other hand, the problem of high cost as in the technique according to Japanese Laid-Open Patent Publication No. 2014-099964 (paragraph [0031]) does not occur in the Japanese Patent No. 5966332 (paragraph [0049]). However, the power transmission efficiency detected according to the technique of Japanese Patent No. 5966332 (paragraph [0049]) varies depending on the state of the electric vehicle. For example, even if the distances between the primary coil and the secondary coil are same at some points, the power transmission efficiency changes depending on the vehicle's speed. Japanese Patent No. 5966332 (paragraph [0049]) did not consider a situation where the states of the electric vehicle vary. Therefore, in the technique according to Japanese Patent No. 5966332 (paragraph [0049]), there is room for improvement in the accuracy of the alignment of the primary coil and the secondary coil.

The present invention has been made in view of the above problem, and an object is to provide a non-contact power transmission system capable of more accurate alignment of the primary coil and the secondary coil.

According to the present invention, a non-contact power transmission system for transmitting power without contact from a primary coil that is provided for a charging station to a secondary coil that is provided for an electric vehicle includes: a primary side control unit that transmits to the primary coil a weak power for alignment of the primary coil and the secondary coil; a voltage detector that detects voltage generated by the weak power that is received by the secondary coil; a storage device that stores a voltage value-horizontal distance characteristic that represents a relation between a distance between a reference part of the primary coil and a reference part of the secondary coil in a horizontal direction, and a value of the voltage in accordance with the distance; a sensor that detects a vehicle state that changes the voltage value-horizontal distance characteristic; a characteristic setting unit that sets the voltage value-horizontal distance characteristic matching the vehicle state on the basis of a value detected by the sensor and the voltage value-horizontal distance characteristic stored in the storage device; and a horizontal distance estimation unit that estimates the distance on the basis of the voltage value-horizontal distance characteristic set by the characteristic setting unit and the value of the voltage detected by the voltage detector.

In the above structure, the voltage value-horizontal distance characteristic is set in accordance with the vehicle state. Therefore, the alignment of the primary coil and the secondary coil can be performed accurately without depending on the vehicle state.

In the present invention, the sensor may include a vehicle speed sensor that detects a vehicle speed of the electric vehicle as the vehicle state, and the characteristic setting unit may set the voltage value-horizontal distance characteristic on the basis of at least the vehicle speed detected by the vehicle speed sensor.

In the above structure, the voltage value-horizontal distance characteristic is set in accordance with the vehicle speed. Therefore, the alignment of the primary coil and the secondary coil can be performed accurately without depending on the vehicle speed.

In the present invention, the sensor may include a vehicle height sensor that detects a vehicle height of the electric vehicle as the vehicle state, and the characteristic setting unit may set the voltage value-horizontal distance characteristic at least on the basis of the vehicle height detected by the vehicle height sensor.

In the above structure, the voltage value-horizontal distance characteristic is set in accordance with the vehicle height. Therefore, the alignment of the primary coil and the secondary coil can be performed accurately without depending on the vehicle height.

In the present invention, the sensor may include an inclination sensor that detects an inclination of the electric vehicle relative to the charging station as the vehicle state, and the characteristic setting unit may set the voltage value-horizontal distance characteristic at least on the basis of the inclination detected by the inclination sensor.

In the above structure, the voltage value-horizontal distance characteristic is set in accordance with the inclination of the vehicle. Therefore, the alignment of the primary coil and the secondary coil can be performed accurately without depending on the inclination.

In the present invention, the storage device may store in advance a referential voltage value-horizontal distance characteristic, and the characteristic setting unit may obtain a coefficient in accordance with the value detected by the sensor, corrects the referential voltage value-horizontal distance characteristic with the obtained coefficient and sets the corrected voltage value-horizontal distance characteristic.

In the above structure, the stored voltage value-horizontal distance characteristic is corrected in accordance with the vehicle state. Therefore, the amount of information to be stored in advance can be reduced.

In the present invention, the storage device may store in advance the voltage value-horizontal distance characteristics in accordance with the vehicle states, and the characteristic setting unit may select a voltage value-horizontal distance characteristic in accordance with the value detected by the sensor and set the selected voltage value-horizontal distance characteristic.

In the above structure, optimum voltage value-horizontal distance characteristics in accordance with the vehicle states are stored beforehand and a voltage value-horizontal distance characteristic is selected and used in accordance with the detected vehicle state. Therefore, the alignment of the primary coil and the secondary coil can be performed more accurately.

In the present invention, the voltage value-horizontal distance characteristic is set in accordance with a value of the vehicle state. Therefore, the alignment of the primary coil and the secondary coil can be performed accurately without depending on the vehicle state.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Description will hereinafter be made of a preferred embodiment of a non-contact power transmission system according to the present invention in detail with reference to the drawings.

1 First Embodiment

[1.1 Structure of Non-Contact Power Transmission System 10]

Figure 1:
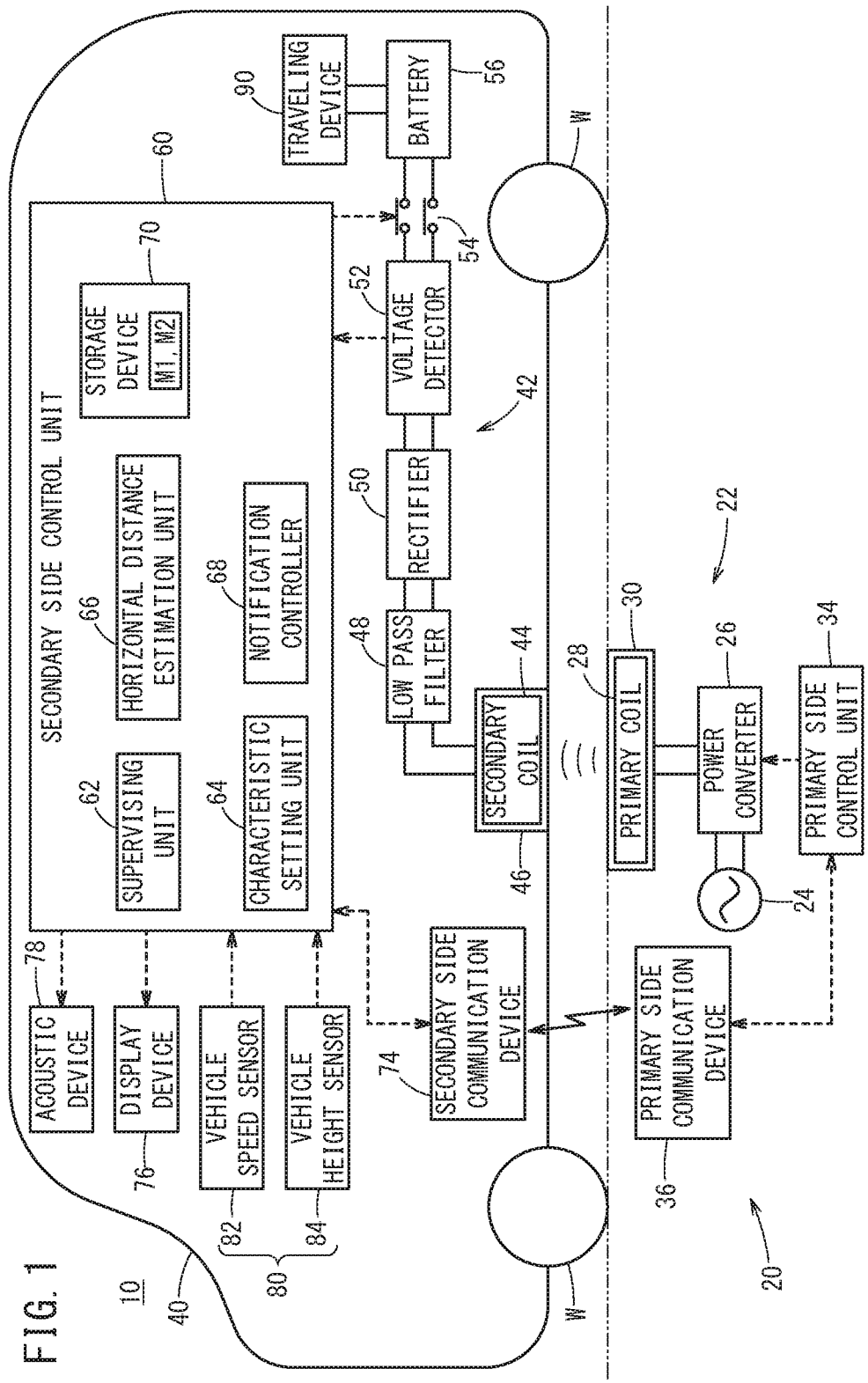
FIG. 1 is a system structure diagram illustrating a non-contact power transmission system according to first and second embodiments.

A structure of a non-contact power transmission system 10 according to a first embodiment will be described with reference to FIG. 1. The non-contact power transmission system 10 includes a charging station 20 on a primary side (power transmission side) that is provided on the ground (installation surface), and an electric vehicle 40 on a secondary side (power reception side). In FIG. 1, components below a two-dot chain line correspond to the charging station 20, and components above the two-dot chain line correspond to the electric vehicle 40. In the non-contact power transmission system 10, a battery 56 that is mounted on the electric vehicle 40 is charged by the charging station 20 without contact.

The charging station 20 mainly includes a power transmission circuit 22, a primary side control unit 34, and a primary side communication device 36. The power transmission circuit 22 includes an alternating current power source 24, a power converter 26 that converts an alternating current power supplied from the alternating current power source 24 into a transmission power, a primary capacitor for resonance (not shown), and a primary coil 28. The primary coil 28 is covered with a primary pad 30 and disposed on the ground (installation surface).

The primary side control unit 34 functions as a predetermined operation unit by a processor such as a CPU (not shown) reading out programs stored in a storage device (not shown) and executing the programs. In the first embodiment, the primary side control unit 34 functions as a power transmission controller that transmits to the primary coil 28 a weak power for alignment of the primary coil 28 and a secondary coil 44 and a charging power for charging the battery 56.

The primary side communication device 36 is connected to the primary side control unit 34 through a communication line. The primary side communication device 36 performs a wireless communication with a secondary side communication device 74 of the electric vehicle 40. For example, a wireless communication such as Wi-Fi (trademark) and Bluetooth (trademark) can be used.

The electric vehicle 40 mainly includes a power reception circuit 42, the battery 56, a secondary side control unit 60, the secondary side communication device 74, a display device 76, an acoustic device 78, sensors 80, and a traveling device 90.

The power reception circuit 42 includes a secondary capacitor for resonance (not shown), the secondary coil 44, a rectifier 50 that rectifies a reception power which is the alternating current power received by the secondary coil 44, and a contactor 54 that switches electrical connection and disconnection between the power reception circuit 42 and the battery 56. The secondary coil 44 is covered with a secondary pad 46 and disposed on a lower surface of the electric vehicle 40.

The power reception circuit 42 further includes a low pass filter 48 that can be connected between the secondary coil 44 and the rectifier 50, and a voltage detector 52 that can be connected between the rectifier 50 and the contactor 54. The low pass filter 48 blocks a high frequency component equal to a predetermined frequency or higher in the weak power received by the secondary coil 44, and outputs a low frequency component less than the predetermined frequency to the rectifier 50. When the weak power is received and a first switching device (not shown) performs a switching operation upon receiving a control instruction from the secondary side control unit 60, the low pass filter 48 is connected to the power reception circuit 42. The voltage detector 52 includes a parallel circuit including a predetermined resistor and a predetermined voltage sensor (neither are shown) as described in Japanese Patent No. 5937631, for example. The voltage sensor detects voltage that is generated between both ends of the resistor when the weak power is received. This voltage is referred to as an LPE voltage. When the weak power is received and a second switching device (not shown) performs a switching operation upon receiving the control instruction from the secondary side control unit 60, the voltage detector 52 is connected to the power reception circuit 42. In this embodiment, the LPE voltage is detected using the power reception circuit 42 that is used in charging. However, a circuit for detecting the LPE voltage may be provided separate from the power reception circuit 42 and in the circuit, the rectifier 50 and the voltage detector 52 may be provided.

The battery 56 includes a lithium ion battery or the like. When the contactor 54 is in a connected state to make the primary coil 28 and the secondary coil 44 magnetically coupled, the battery 56 is charged through the power reception circuit 42.

The secondary side control unit 60 is an ECU and manages a power reception process. The secondary side control unit 60 functions as a supervising unit 62, a characteristic setting unit 64, a horizontal distance estimation unit 66, and a notification controller 68 by a processor such as a CPU (not shown) reading out programs stored in a storage device 70 and executing the programs.

The supervising unit 62 governs the power reception process. The characteristic setting unit 64 sets a voltage value-horizontal distance characteristic Cs matching a vehicle state on the basis of values detected by the sensors 80 and a voltage value-horizontal distance characteristic C stored in the storage device 70. The horizontal distance estimation unit 66 estimates a separation distance X in the horizontal direction (hereinafter, referred to as "horizontal distance") between a reference part of the primary coil 28 (center of coil) and a reference part of the secondary coil 44 (center of coil), on the basis of the voltage value-horizontal distance characteristic Cs set by the characteristic setting unit 64 and an LPE voltage value (hereinafter, also referred to as voltage value) V_LPE detected by the voltage detector 52. The notification controller 68 outputs an instruction signal to the display device 76 and the acoustic device 78 in accordance with the horizontal distance X between the primary coil 28 and the secondary coil 44 which has been estimated by the horizontal distance estimation unit 66.

The storage device 70 stores predetermined values, default values, or the like that are used by various programs and various calculations. In addition, the storage device 70 stores information of the voltage value-horizontal distance characteristic C illustrated in FIG. 2 as a map M1. Furthermore, the storage device 70 stores information for obtaining coefficients a1, a2, a3 as a map M2. The voltage value-horizontal distance characteristic C and the coefficients a1, a2, a3 will be described in [1.2] below.

The secondary side communication device 74 is connected to the secondary side control unit 60 through a communication line. The secondary side communication device 74 performs the wireless communication with the primary side communication device 36 of the charging station 20 as described above.

The display device 76 displays information that represents the horizontal distance X between the primary coil 28 and the secondary coil 44 in accordance with an instruction signal output from the secondary side control unit 60. For example, a screen displays a bird's-eye view that simulatively shows positions of the primary coil 28 and the secondary coil 44 at the time of the displaying of the view, or the horizontal distance itself between the primary coil 28 and the secondary coil 44. The acoustic device 78 causes a speaker to output information that represents the horizontal distance X between the primary coil 28 and the secondary coil 44 in accordance with the instruction signal output from the secondary side control unit 60.

The sensors 80 include various sensors for detecting the vehicle state that varies the voltage value-horizontal distance characteristic C. The sensors 80 include a vehicle speed sensor 82 that detects a vehicle speed v of the electric vehicle 40, and vehicle height sensors 84 that detect a vehicle height h of the electric vehicle 40. In this specification, the vehicle height h is the height from the ground to the lower surface of the electric vehicle 40. The vehicle height sensor 84 is a distance sensor that measures a distance between the ground and the lower surface of the electric vehicle 40 with light or radio waves. In the first embodiment, the vehicle height sensors 84 are provided at four positions; a left side and a right side of a front lower surface and a left side and a right side of a rear lower surface of the electric vehicle 40. On the basis of values detected by the four vehicle height sensors 84, not only the height h of the electric vehicle 40 but also an inclination i of the electric vehicle 40 with respect to the ground in the front-rear direction and the left-right direction are obtained. Therefore, the four vehicle height sensors 84 also function as an inclination sensor.

The traveling device 90 includes a driving force device that generates a driving force in accordance with an occupant's operation of an accelerator pedal. The traveling device 90 further includes a steering device that steers the vehicle in accordance with an occupant's operation of a steering wheel, and a braking device that generates a braking force in accordance with an occupant's operation of a brake pedal. The driving force device includes an electric motor as a driving source to which the battery 56 supplies power.

[1.2 Voltage Value-Horizontal Distance Characteristic C]

It is assumed that the secondary coil 44 moves approximately straight toward a place above the primary coil 28 as the electric vehicle 40 travels. In this case, there is a relation as shown in FIG. 2 between the voltage value V_LPE detected by the voltage detector 52, and the horizontal distance X between the primary coil 28 and the secondary coil 44.

That is to say, when the electric vehicle 40 approaches the primary coil 28 from a distance and reaches a position (horizontal distance X=X1) at which the secondary coil 44 can receive the weak power transmitted from the primary coil 28, the voltage value V_LPE starts to increase from a first predetermined value V_LPE1. As the electric vehicle 40 travels and the horizontal distance X decreases, the voltage value V_LPE gradually increases so that the voltage value V_LPE takes a local maximum value V_LPE2 at a position of the horizontal distance X=X2. As the electric vehicle 40 travels further and the horizontal distance X decreases, the voltage value V_LPE gradually decreases so that the voltage value V_LPE takes a local minimum value V_LPE3 at a position of the horizontal distance X=X3. As the electric vehicle 40 travels much further and the horizontal distance X decreases, the voltage value V_LPE gradually increases so that the voltage value V_LPE takes a maximum value V_LPEmax at a position of the horizontal distance X=0; that is, when the center of the secondary coil 44 has come closest to the place above the center of the primary coil 28.

Figure 2:
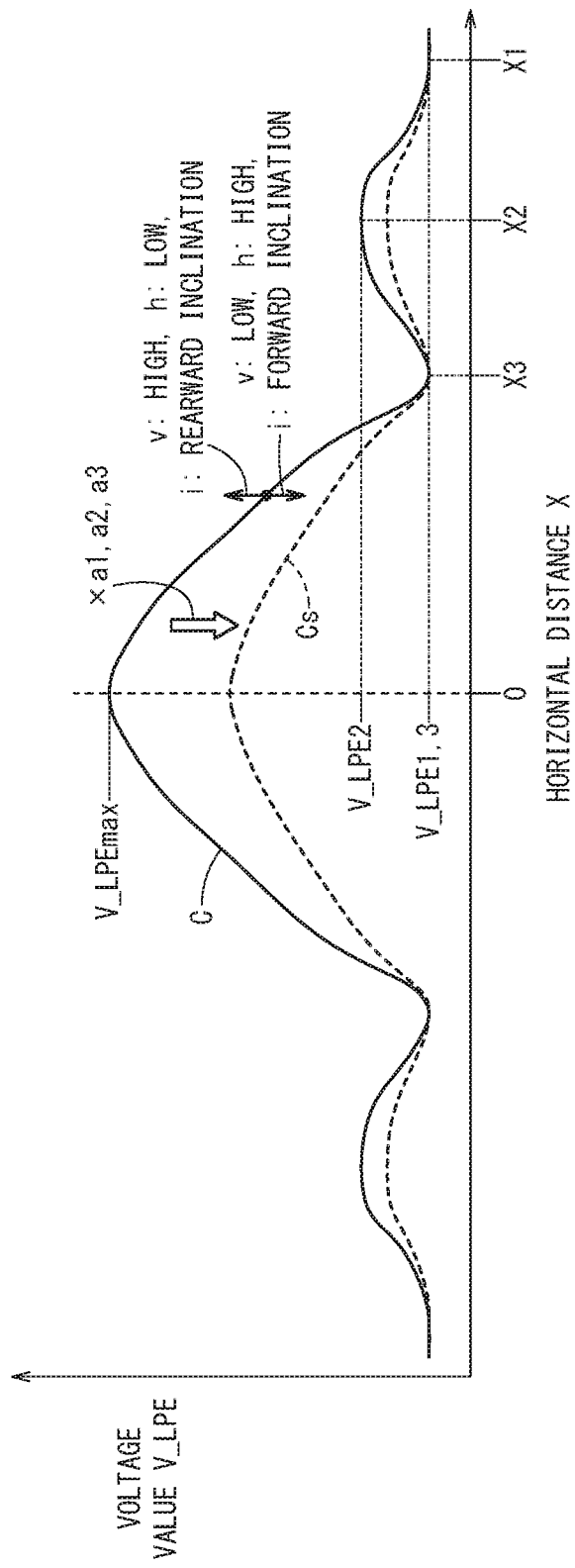
FIG. 2 is a diagram illustrating a voltage value-horizontal distance characteristic.

Incidentally, the voltage value-horizontal distance characteristic C illustrated in FIG. 2 varies as a vehicle state, for example, a vehicle speed v, a vehicle height h, or an inclination (particularly, inclination in the front-rear direction) i changes. Specifically, the higher the vehicle speed v, the larger the change in magnetic flux passing through the secondary coil 44 per unit time; thus, the voltage value V_LPE increases. The lower the vehicle speed v, the smaller the change in magnetic flux passing through the secondary coil 44 per unit time; thus, the voltage value V_LPE decreases. The lower the vehicle height h, the shorter a separation distance between the primary coil 28 and the secondary coil 44 in the perpendicular direction; thus, the voltage value V_LPE increases. The higher the vehicle height h, the longer the separation distance between the primary coil 28 and the secondary coil 44 in the perpendicular direction; thus, the voltage value V_LPE decreases. When the traveling direction of the electric vehicle 40 is defined as the front direction, as the inclination i expresses that the electric vehicle 40 inclines more rearward, a passage area of the magnetic flux passing through the secondary coil 44 becomes larger; thus, the voltage value V_LPE increases. On the other hand, as the inclination i expresses that the electric vehicle 40 inclines more forward, the passage area of the magnetic flux passing through the secondary coil 44 becomes smaller; thus, the voltage value V_LPE decreases.

In the first embodiment, the storage device 70 stores as the map M1 the voltage value-horizontal distance characteristic C given at the time of the vehicle being in a reference vehicle state; that is, when the vehicle speed is a reference vehicle speed vs, the vehicle height is a reference vehicle height hs, and the vehicle inclination is a reference inclination is. The reference vehicle state can be set arbitrarily.

In the first embodiment, the storage device 70 stores, as the map M2, information for obtaining the coefficients a1, a2, a3 that are used when the voltage value-horizontal distance characteristic C stored as the map M1 is corrected to the voltage value-horizontal distance characteristic Cs that match vehicle states. The coefficient a1 is associated with the vehicle speed v, the coefficient a2 is associated with the vehicle height h, and the coefficient a3 is associated with the inclination i. The coefficient a1 is determined based on the vehicle speed v, the coefficient a2 is determined based on the vehicle height h, and the coefficient a3 is determined based on the inclination i.

[1.3 Alignment Process]

Figure 3:
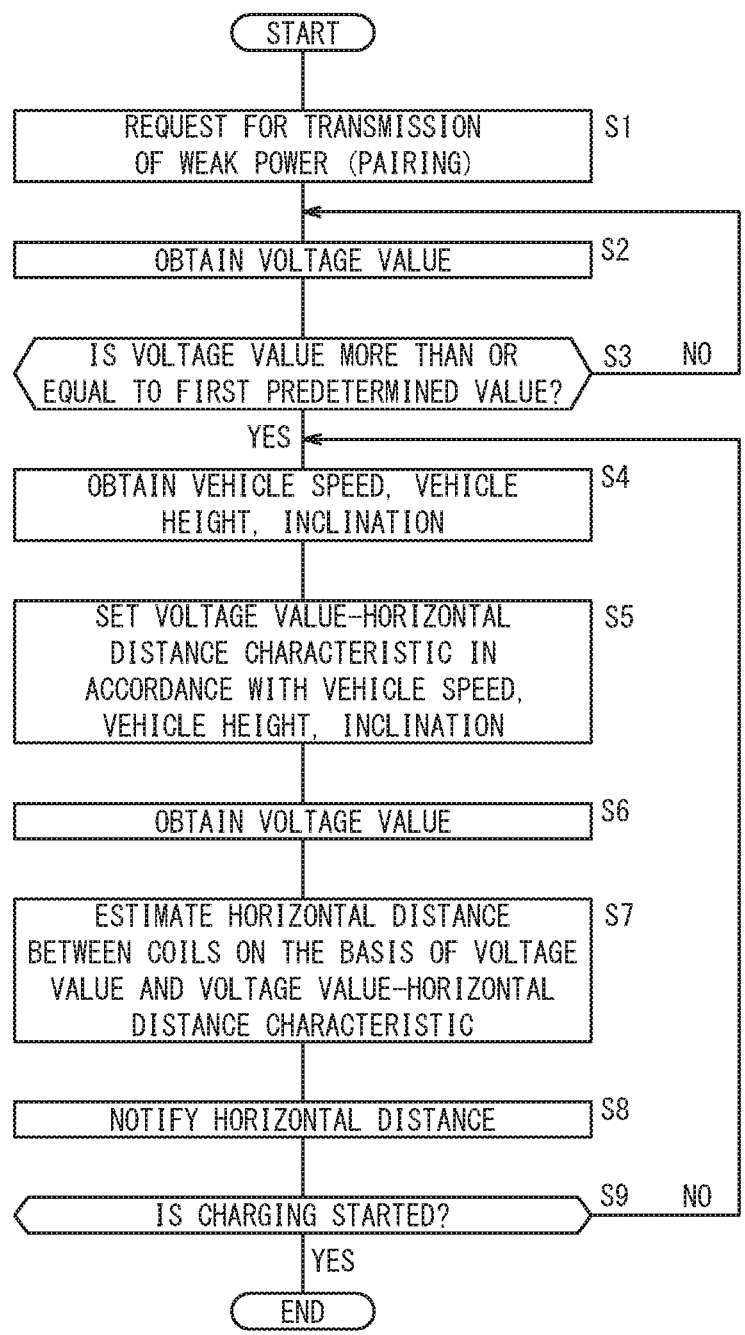
FIG. 3 is a flowchart that represents processes performed in an electric vehicle in the first and second embodiments.

An alignment process performed on the electric vehicle 40 side according to the first embodiment is explained mainly with reference to FIG. 3. A process described below is performed when the occupant of the electric vehicle 40 turns on a parking start switch (not shown). As illustrated FIG. 4A, the charging station 20 is sectioned off by lines 150. The occupant turns on the parking start switch at a position P1 that is away from the charging station 20 so that the electric vehicle 40 travels toward the charging station 20. An operation signal of the parking start switch is transmitted to the secondary side control unit 60.

In step S1, the supervising unit 62 instructs the secondary side communication device 74 to request the transmission of the weak power. The secondary side communication device 74 performs pairing, such as authentication, with the primary side communication device 36 and transmits a transmission request signal to request for the weak power. The primary side control unit 34 controls the power converter 26 in accordance with the transmission request signal received by the primary side communication device 36 to start the power transmission. The power converter 26 converts the alternating current power supplied from the alternating current power source 24 into a predetermined weak power and supplies the weak power to the primary coil 28. Then, the weak power for alignment is transmitted from the primary coil 28 to the outside.

Figure 4A:
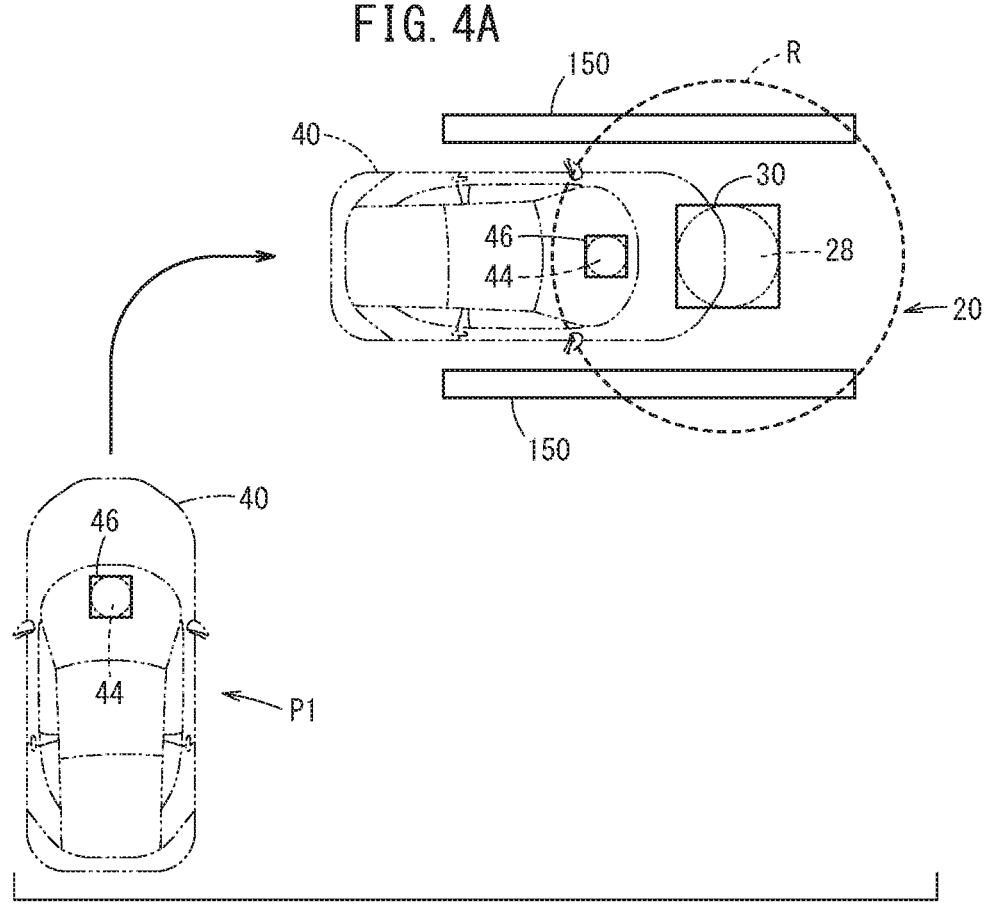
FIG. 4A and FIG. 4B are explanatory views for describing a parking operation of the electric vehicle relative to a charging station.

In step S2, the supervising unit 62 obtains the voltage value V_LPE detected by the voltage detector 52. In step S3, the supervising unit 62 determines whether the voltage value V_LPE is more than or equal to the first predetermined value V_LPE1, that is, whether the secondary coil 44 has entered a range R where the weak power can be received, as illustrated in FIG. 4A. If the voltage value V_LPE is more than or equal to the first predetermined value V_LPE1, that is, the secondary coil 44 has entered the range R where the weak power can be received (step S3: YES), the process advances to step S4. On the other hand, if the voltage value V_LPE is less than the first predetermined value V_LPE1, that is, the secondary coil 44 has not yet entered the range R where the weak power can be received (step S3: NO), the process returns to step S2.

If the process has advanced from step S3 to step S4, the characteristic setting unit 64 obtains the vehicle speed v, the vehicle height h, and the inclination i. The vehicle speed v is obtained from a value detected by the vehicle speed sensor 82. The vehicle height h is obtained from an average value of values detected by the vehicle height sensors 84. The inclination i is obtained from a difference between the average value of the values detected by the vehicle height sensors 84 on a front side and the average value of the values detected by the vehicle height sensors 84 on a rear side, and a distance (default value) between the vehicle height sensor 84 on the front side and the vehicle height sensor 84 on the rear side.

In step S5, the characteristic setting unit 64 obtains the coefficients a1, a2, a3 in accordance with each vehicle state (vehicle speed v, vehicle height h, inclination i) using the map M2. As illustrated FIG. 2, the voltage value-horizontal distance characteristic C stored as the map M1 is multiplied by each of the coefficients a1, a2, a3 so that the voltage value-horizontal distance characteristic Cs matching a vehicle state is set.

In step S6, the supervising unit 62 obtains the voltage value V_LPE detected by the voltage detector 52. In step S7, the horizontal distance estimation unit 66 estimates the horizontal distance X matching the voltage value V_LPE, on the basis of the voltage value-horizontal distance characteristic Cs set by the characteristic setting unit 64 and the voltage value V_LPE obtained by the supervising unit 62.

In step S8, the notification controller 68 outputs, on the basis of the horizontal distance X estimated by the horizontal distance estimation unit 66, the instruction signal that instructs the display device 76 and the acoustic device 78 to perform notification. The display device 76 displays the horizontal distance X, or the bird's-eye view of the primary coil 28 and the secondary coil 44 on the screen. The acoustic device 78 outputs from the speaker a voice that notifies the horizontal distance X or a signal sound matching the horizontal distance X. For example, an interval between the output and the stop of the signal sound is changed in accordance with the horizontal distance X.

Figure 4B:
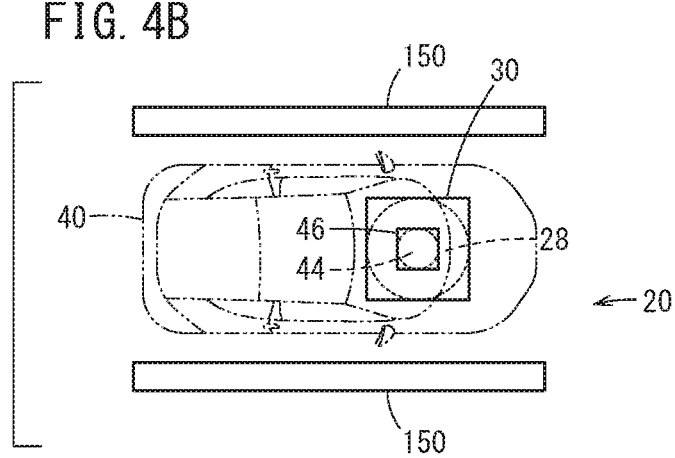

In step S9, the supervising unit 62 determines whether to start the charging. As illustrated in FIG. 4B, after the alignment of the center of the secondary coil 44 relative to the center of the primary coil 28, the occupant stops the electric vehicle 40 and turns on a charging start switch (not shown). If the charging start switch is turned on (step S9: YES), the alignment process ends. On the other hand, if the charging start switch is not turned on (step S9: NO), the process returns to step S4.

An operation signal of the charging start switch is transmitted to the secondary side control unit 60. The supervising unit 62 outputs instruction signals to the secondary side communication device 74. The instruction signals instruct the secondary side communication device 74 to request the stopping of the weak power (stop request) and the transmitting of the charging power (transmission request). The secondary side communication device 74 transmits the stop request signal for stopping the weak power and the transmission request signal for transmitting the charging power to the primary side communication device 36. The primary side control unit 34 controls the power convertor 26 in accordance with the stop request signal received by the primary side communication device 36 so as to stop the transmission of the weak power, and controls the power convertor 26 in accordance with the transmission request signal received by the primary side communication device 36 so as to start the transmission of the charging power.

[1.4 Modification]

Note that, in the first embodiment, the vehicle speed v, the vehicle height h, and the inclination i are detected as the vehicle state. However, other elements that change the voltage value-horizontal distance characteristic C can be detected. Alternatively, the voltage value-horizontal distance characteristic C can be corrected by detecting any one or two of the vehicle speed v, the vehicle height h, and the inclination i.

In the first embodiment, the vehicle height sensors 84 are used as the inclination sensor. However, a sensor that detects the inclination i of the electric vehicle 40 such as a gyro may be provided. In this case, it is preferable that, on the electric vehicle 40 side, information on the inclination of the primary coil 28 is obtained from the primary side communication device 36, and the inclination i of the secondary coil 44 relative to the primary coil 28 is obtained on the basis of the information and a value detected by the gyro.

The vehicle height sensor 84 may be, instead of a distance sensor, a sensor that detects a stroke of a suspension that suspends each wheel W; for example, a displacement sensor. In this case, it is preferable that the stroke of the suspension and the vehicle height h are associated with each other in advance, and the vehicle height h is calculated based on values detected by the displacement sensor.

2 Second Embodiment

In the first embodiment, a referential voltage value-horizontal distance characteristic C is corrected, on the basis of the values detected by the sensors 80, to the voltage value-horizontal distance characteristic Cs that matches each vehicle state. As will be described in a second embodiment, however, each voltage value-horizontal distance characteristic Cs may be stored in advance, and the voltage value-horizontal distance characteristic Cs matching each vehicle state may be selected based on the values detected by the sensors 80.

In the second embodiment, the storage device 70 stores in advance, as the map M1, the voltage value-horizontal distance characteristics Cs matching the vehicle states. In the second embodiment, the voltage value-horizontal distance characteristics Cs are collectively defined as the voltage value-horizontal distance characteristic C. The characteristic setting unit 64 selects, from the voltage value-horizontal distance characteristic C, the voltage value-horizontal distance characteristic Cs matching each vehicle state that is detected by the sensors 80 and sets the selected voltage value-horizontal distance characteristic Cs as the characteristic to be used.

Except the aforementioned difference, a structure and a process of the non-contact power transmission system 10 according to the second embodiment are the same as the structure (FIG. 1) and the process (FIG. 3) of the non-contact power transmission system 10 according to the first embodiment.

3 Third Embodiment

[3.1 Structure of Non-Contact Power Transmission System 10]

Figure 5:
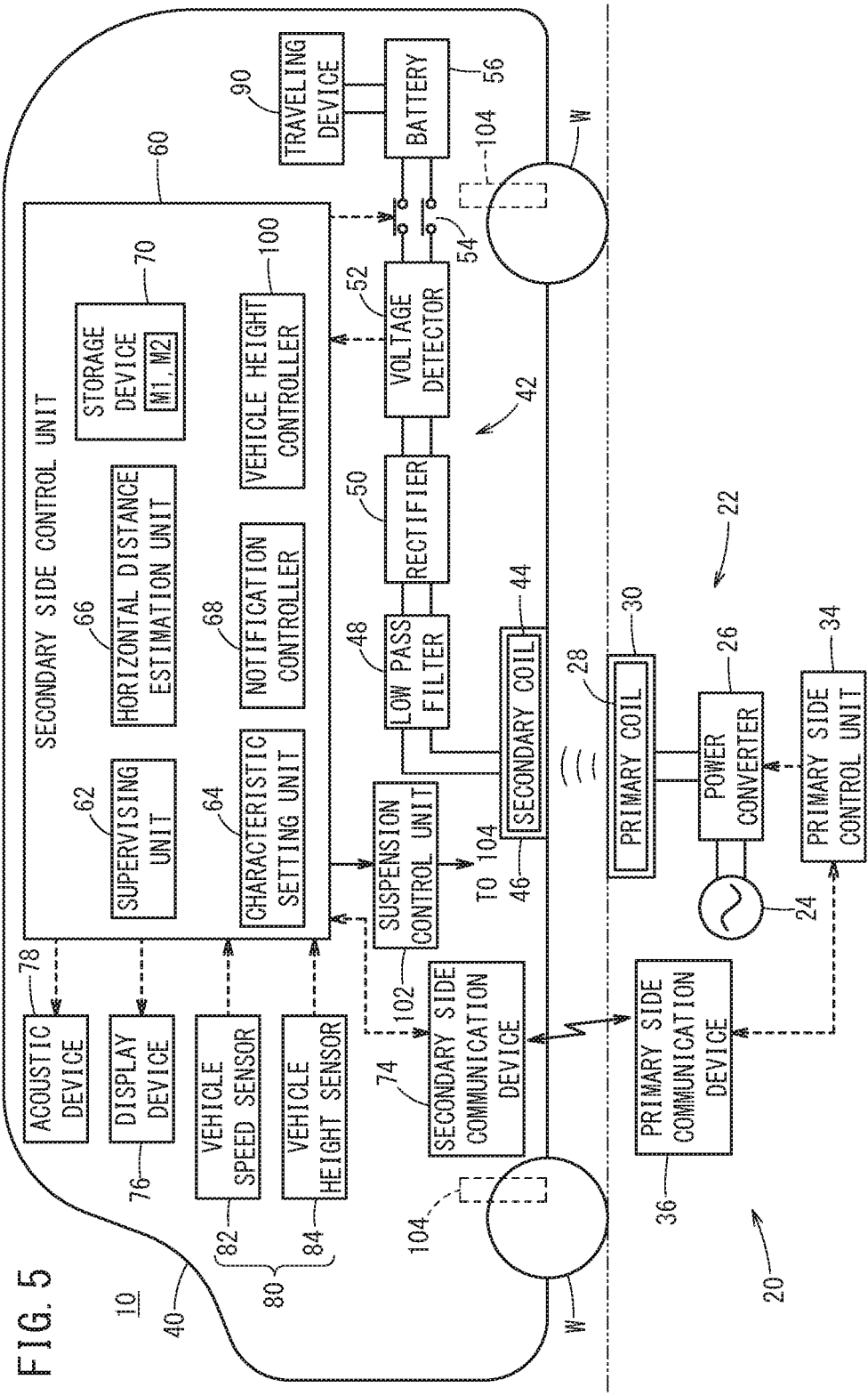
FIG. 5 is a system structure diagram illustrating a non-contact power transmission system according to third and fourth embodiments.

A structure of the non-contact power transmission system 10 according to a third embodiment is described with reference to FIG. 5. Elements that are the same as those of the first embodiment are given the same reference numerals without the repeated description thereof. The non-contact power transmission system 10 according to the third embodiment is different from the non-contact power transmission system 10 according to the first embodiment in that the non-contact power transmission system 10 according to the third embodiment includes a structure for adjusting the vehicle height h and the inclination i.

The secondary side control unit 60 also functions as a vehicle height controller 100 by the processor such as a CPU (not shown) reading out programs stored in the storage device 70 and executing the programs. The vehicle height controller 100 outputs an instruction signal to a suspension control unit 102.

The suspension control unit 102 includes a suspension ECU. The suspension ECU controls, in accordance with the instruction signal output from the secondary side control unit 60, an amount of expansion of a suspension 104 that is provided for each wheel W. The suspension 104 works in accordance with fluid or electric power that is controlled by the suspension control unit 102.

[3.2 Alignment Process]

Figure 6:
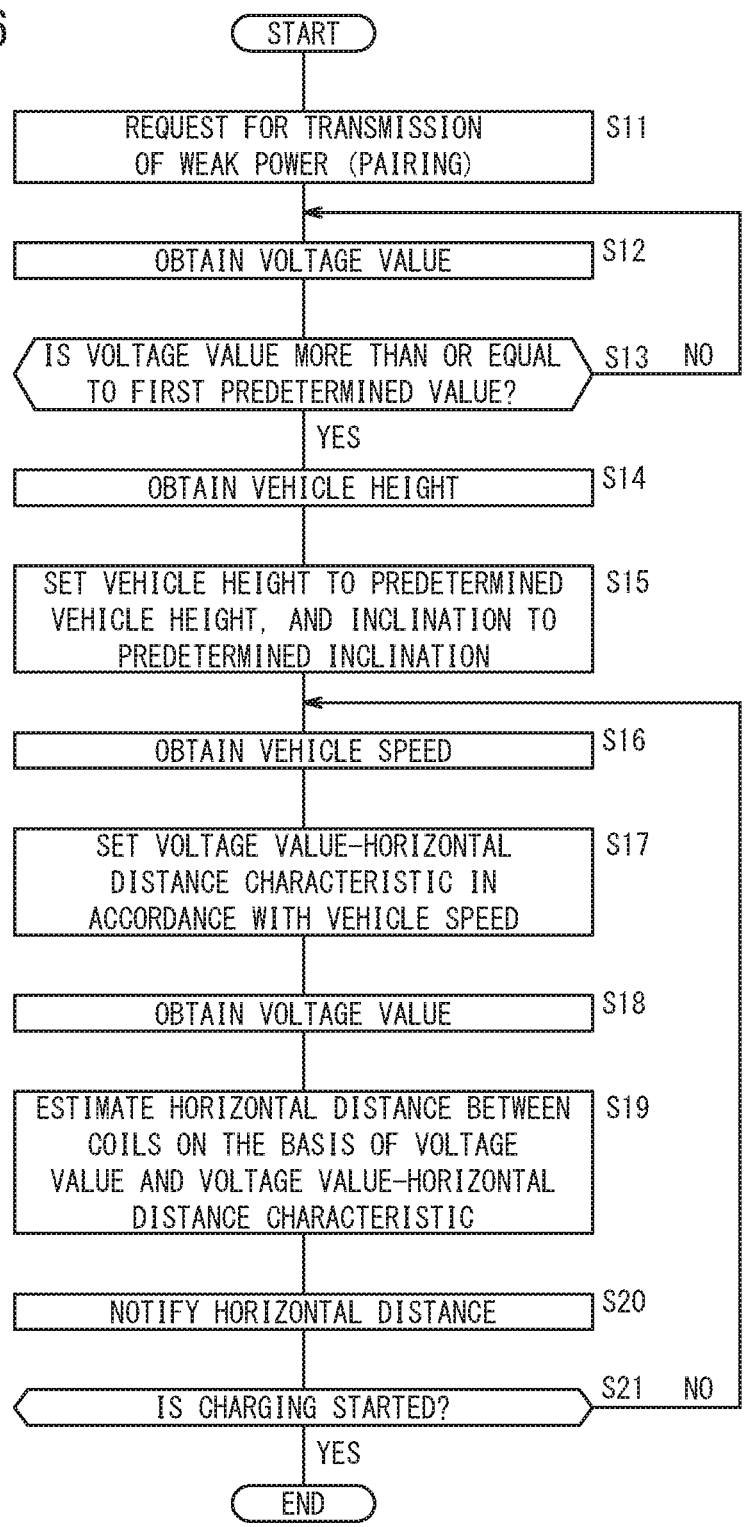
FIG. 6 is a flowchart that represents processes performed in an electric vehicle in the third and fourth embodiments.

The alignment process performed on the electric vehicle 40 side according to the third embodiment is described mainly with reference to FIG. 6. A process from step S11 to step S13 and from step S18 to step S21 in the third embodiment shown in FIG. 6 is the same as the process from step S1 to step S3 and from step S6 to step S9 in the first embodiment shown in FIG. 3. Hereinafter a process from step S14 to step S17 that is particular to the third embodiment is described.

In step S14, the vehicle height controller 100 obtains values detected by the vehicle height sensors 84. In step S15, in order to set the vehicle height h of a predetermined part of the electric vehicle 40 to a predetermined vehicle height hp and set the inclination i to a predetermined inclination ip, the vehicle height controller 100 calculates an amount of how much each suspension 104 should expand or contract and an instruction value for controlling the suspensions 104 to achieve the amount of expansion or contraction. Then, the vehicle height controller 100 outputs the instruction signal to the suspension control unit 102. The suspension control unit 102 controls each suspension 104 in accordance with the instruction signal. Then, the vehicle height h of the predetermined part of the electric vehicle 40 becomes the predetermined vehicle height hp, and the inclination i becomes the predetermined inclination ip.

In step S16, the characteristic setting unit 64 obtains the vehicle speed v. The vehicle speed v is obtained from the value detected by the vehicle speed sensor 82. In step S17, the characteristic setting unit 64 obtains, by using the map M2, the coefficients a1, a2, a3 that match each vehicle state (vehicle speed v, vehicle height hp, inclination ip). Then, the voltage value-horizontal distance characteristic C stored as the map M1 is multiplied by the coefficients a1, a2, a3 so that the voltage value-horizontal distance characteristic Cs that matches each vehicle state (vehicle speed v, vehicle height hp, inclination ip) is set.

4 Fourth Embodiment

In the third embodiment, a referential voltage value-horizontal distance characteristic C corresponding is corrected, on the basis of the values detected by the sensors 80, to the voltage value-horizontal distance characteristic Cs that matches each vehicle state (vehicle speed v, vehicle height hp, inclination ip). As will be described in a fourth embodiment, however, each voltage value-horizontal distance characteristic Cs may be stored in advance, and the voltage value-horizontal distance characteristic Cs matching each vehicle state (vehicle speed v, vehicle height hp, inclination ip) may be selected based on the value detected by the vehicle speed sensor 82.

In the fourth embodiment, the storage device 70 stores in advance as the map M1 the voltage value-horizontal distance characteristics Cs that match the vehicle states. In the fourth embodiment, the voltage value-horizontal distance characteristics Cs are collectively defined as the voltage value-horizontal distance characteristic C. The characteristic setting unit 64 selects from among the voltage value-horizontal distance characteristics C the voltage value-horizontal distance characteristic Cs that matches the vehicle speed v that is detected by the vehicle speed sensor 82, the vehicle height hp (default value), and the inclination ip (default value) and sets the selected voltage value-horizontal distance characteristic Cs as the characteristic to be used.

Except the aforementioned difference, a structure and a process of the non-contact power transmission system 10 according to the fourth embodiment are the same as the structure (FIG. 5) and the process (FIG. 6) of the non-contact power transmission system 10 according to the third embodiment.

5 Summary of Each Embodiment

Each embodiment relates to the non-contact power transmission system 10 for transmitting power without contact from the primary coil 28 that is provided for the charging station 20 to the secondary coil 44 that is provided for the electric vehicle 40. The non-contact power transmission system 10 includes: the primary side control unit 34 that transmits to the primary coil 28 the weak power for alignment of the primary coil 28 and the secondary coil 44; the voltage detector 52 that detects voltage generated by the weak power that is received by the secondary coil 44; the storage device 70 that stores the voltage value-horizontal distance characteristic C that represents the relation between the horizontal distance X between the center of the primary coil 28 (reference part) and the center of the secondary coil 44 (reference part), and the voltage value V_LPE in accordance with the horizontal distance X; the sensors 80 that detect the vehicle state that changes the voltage value-horizontal distance characteristic C; the characteristic setting unit 64 that sets the voltage value-horizontal distance characteristic Cs that matches the vehicle state, on the basis of the values detected by the sensors 80 and the voltage value-horizontal distance characteristics C stored in the storage device 70; and the horizontal distance estimation unit 66 that estimates the horizontal distance X on the basis of the voltage value-horizontal distance characteristic Cs set by the characteristic setting unit 64 and the voltage value V_LPE detected by the voltage detector 52.

In the above structure, the voltage value-horizontal distance characteristic Cs is set in accordance with the vehicle state. Therefore, the alignment of the primary coil 28 and the secondary coil 44 can be performed accurately irrespective of differences among vehicle states.

The sensors 80 include the vehicle speed sensor 82 that detects the vehicle speed v of the electric vehicle 40 as the vehicle state. In this case, the characteristic setting unit 64 sets the voltage value-horizontal distance characteristic Cs at least on the basis of the vehicle speed v detected by the vehicle speed sensor 82.

In the above structure, the voltage value-horizontal distance characteristic Cs is set in accordance with the vehicle speed v. Therefore, the alignment of the primary coil 28 and the secondary coil 44 can be performed accurately irrespective of the differences among the vehicle speeds v.

The sensors 80 include the vehicle height sensor 84 that detects the vehicle height h of the electric vehicle 40 as the vehicle state. In this case, the characteristic setting unit 64 sets the voltage value-horizontal distance characteristic Cs on the basis of at least the vehicle height h detected by the vehicle height sensor 84.

In the above structure, the voltage value-horizontal distance characteristic Cs is set in accordance with the vehicle height h. Therefore, the alignment of the primary coil 28 and the secondary coil 44 can be performed accurately irrespective of the differences among the vehicle heights h.

The sensors 80 include the inclination sensor that detects, as the vehicle state, the inclination i of the electric vehicle 40 relative to the charging station 20, that is, the four vehicle height sensors 84. The characteristic setting unit 64 sets the voltage value-horizontal distance characteristic Cs at least on the basis of the inclination i detected by the four vehicle height sensors 84.

In the above structure, the voltage value-horizontal distance characteristic Cs is set in accordance with the inclination i of the electric vehicle 40. Therefore, the alignment of the primary coil 28 and the secondary coil 44 can be performed accurately irrespective of the differences among the inclinations i.

In the first and third embodiments, the storage device 70 stores in advance a referential voltage value-horizontal distance characteristic C. The characteristic setting unit 64 obtains the coefficients a1, a2, a3 that represent the vehicle state, corrects the referential voltage value-horizontal distance characteristic C with the obtained coefficients a1, a2, a3, and sets a corrected voltage value-horizontal distance characteristic C.

In the above structure, the stored voltage value-horizontal distance characteristic C is corrected in accordance with the vehicle state. Therefore, the amount of information to be stored in advance can be reduced.

In the second and fourth embodiments, the storage device 70 stores in advance the voltage value-horizontal distance characteristics Cs in accordance with the vehicle states. The characteristic setting unit 64 selects and sets the voltage value-horizontal distance characteristic Cs that matches the values detected by the sensors 80.

In the above structure, the optimum voltage value-horizontal distance characteristics Cs in accordance with the vehicle states are stored and the voltage value-horizontal distance characteristic Cs is selected and used in accordance with the detected vehicle state. Therefore, the alignment of the primary coil 28 and the secondary coil 44 can be performed accurately.

In each embodiment, the low pass filter 48 is provided for the power reception circuit 42. For example, when the electric vehicle 40 runs over an obstacle or the like when the coils are aligned, the voltage value V_LPE temporarily largely fluctuates. The low pass filter 48 removes the high frequency component of the voltage value V_LPE so that the temporary fluctuation of the voltage value V_LPE can be suppressed.

Note that the non-contact power transmission system according to the present invention is not limited to the above embodiments, and various structures can be employed without departing from the concept of the present invention. For example, the non-contact power transmission system according to the present invention can be used for a vehicle equipped with a parking assist device or the automatic parking device (such as Japanese Laid-Open Patent Publication No. 2015-074266) that automatically performs at least one of steering, driving, and braking.

In each embodiment, the weak power is transmitted from the primary coil 28 provided for the charging station 20, and is received by the secondary coil 44 provided for the electric vehicle 40. In reverse, the weak power can be transmitted from the secondary coil 44 provided for the electric vehicle 40, and received by the primary coil 28 provided for the charging station 20. In this case, the charging station 20 includes a structure corresponding to the power reception circuit 42, and the electric vehicle 40 includes a structure corresponding to the power transmission circuit 22. In addition, the primary side control unit 34 includes functions similar to those of the secondary side control unit 60. Furthermore, during the alignment, information of the horizontal distance X is regularly transmitted from the primary side communication device 36 to the secondary side communication device 74, and the information of the horizontal distance X is notified by the display device 76 and/or the acoustic device 78.

What is claimed is:

1. A non-contact power transmission system for transmitting power without contact from a primary coil that is provided for a charging station to a secondary coil that is provided for an electric vehicle, the system comprising:
   a primary side control unit that transmits to the primary coil a weak power for alignment of the primary coil and the secondary coil;
   a voltage detector that detects voltage generated by the weak power that is received in the secondary coil;
   a storage device that stores a voltage value-horizontal distance characteristic that represents a relation between a distance between a reference part of the primary coil and a reference part of the secondary coil in a horizontal direction, and a value of the voltage in accordance with the distance;
   a sensor that detects a vehicle state that changes the voltage value-horizontal distance characteristic;
   a characteristic setting unit that sets a voltage value-horizontal distance characteristic that matches the vehicle state, on the basis of a value detected by the sensor and the voltage value-horizontal distance characteristic stored in the storage device; and
   a horizontal distance estimation unit that estimates the distance on the basis of the voltage value-horizontal distance characteristic set by the characteristic setting unit and the value of the voltage detected by the voltage detector, wherein
   the storage device stores in advance a referential voltage value-horizontal distance characteristic; and
   the characteristic setting unit obtains a coefficient in accordance with the value detected by the sensor, corrects the referential voltage value-horizontal distance characteristic with the obtained coefficient and sets the corrected voltage value-horizontal distance characteristic.

2. The non-contact power transmission system according to claim 1, wherein:
   the sensor includes a vehicle speed sensor that detects a vehicle speed of the electric vehicle as the vehicle state; and
   the characteristic setting unit sets the voltage value-horizontal distance characteristic at least on the basis of the vehicle speed detected by the vehicle speed sensor.

3. The non-contact power transmission system according to claim 1, wherein:
   the sensor includes a vehicle height sensor that detects a vehicle height of the electric vehicle as the vehicle state; and
   the characteristic setting unit sets the voltage value-horizontal distance characteristic at least on the basis of the vehicle height detected by the vehicle height sensor.

4. The non-contact power transmission system according to claim 1, wherein:
   the sensor includes an inclination sensor that detects an inclination of the electric vehicle with respect to the charging station as the vehicle state; and
   the characteristic setting unit sets the voltage value-horizontal distance characteristic at least on the basis of the inclination detected by the inclination sensor.

5. A non-contact power transmission system for transmitting power without contact from a primary coil that is provided for a charging station to a secondary coil that is provided for an electric vehicle, the system comprising:
   a primary side control unit that transmits to the primary coil a weak power for alignment of the primary coil and the secondary coil;
   a voltage detector that detects voltage generated by the weak power that is received in the secondary coil;
   a storage device that stores a voltage value-horizontal distance characteristic that represents a relation between a distance between a reference part of the primary coil and a reference part of the secondary coil in a horizontal direction, and a value of the voltage in accordance with the distance;
   a sensor that detects a vehicle state that changes the voltage value-horizontal distance characteristic;
   a characteristic setting unit that sets a voltage value-horizontal distance characteristic that matches the vehicle state, on the basis of a value detected by the sensor and the voltage value-horizontal distance characteristic stored in the storage device; and
   a horizontal distance estimation unit that estimates the distance on the basis of the voltage value-horizontal distance characteristic set by the characteristic setting unit and the value of the voltage detected by the voltage detector, wherein
   the sensor includes an inclination sensor that detects an inclination of the electric vehicle with respect to the charging station as the vehicle state; and the characteristic setting unit sets the voltage value-horizontal distance characteristic at least on the basis of the inclination detected by the inclination sensor.

6. The non-contact power transmission system according to claim 5, wherein:
the sensor includes a vehicle speed sensor that detects a vehicle speed of the electric vehicle as the vehicle state; and
the characteristic setting unit sets the voltage value-horizontal distance characteristic at least on the basis of the vehicle speed detected by the vehicle speed sensor.

7. The non-contact power transmission system according to claim 5, wherein:
the sensor includes a vehicle height sensor that detects a vehicle height of the electric vehicle as the vehicle state; and
the characteristic setting unit sets the voltage value-horizontal distance characteristic at least on the basis of the vehicle height detected by the vehicle height sensor.

8. The non-contact power transmission system according to claim 5, wherein
the storage device stores in advance a referential voltage value-horizontal distance characteristic; and
the characteristic setting unit obtains a coefficient in accordance with the value detected by the sensor, corrects the referential voltage value-horizontal distance characteristic with the obtained coefficient and sets the corrected voltage value-horizontal distance characteristic.

* * * * *